(12) United States Patent
Marcovici et al.

(10) Patent No.: US 7,593,717 B2
(45) Date of Patent: Sep. 22, 2009

(54) AUTHENTICATING ACCESS TO A WIRELESS LOCAL AREA NETWORK BASED ON SECURITY VALUE(S) ASSOCIATED WITH A CELLULAR SYSTEM

(75) Inventors: Michael Marcovici, Montville, NJ (US); Semyon B. Mizikovsky, Morganville, NJ (US); Sarvar M. Patel, Wheaton, IL (US); Uri Blumenthal, Fair Lawn, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1047 days.

(21) Appl. No.: 10/661,715

(22) Filed: Sep. 12, 2003

(65) Prior Publication Data

US 2005/0113067 A1    May 26, 2005

(51) Int. Cl.
*H04L 9/32* (2006.01)
*H04L 9/00* (2006.01)

(52) U.S. Cl. .......................... 455/411; 713/171; 380/44

(58) Field of Classification Search .................. None
See application file for complete search history.

(56) References Cited

U.S. PATENT DOCUMENTS

| | | | |
|---|---|---|---|
| 2002/0012433 A1* | 1/2002 | Haverinen et al. | 380/247 |
| 2002/0085516 A1* | 7/2002 | Bridgelall | 370/329 |
| 2002/0114470 A1* | 8/2002 | Mauro et al. | 380/270 |
| 2002/0174335 A1* | 11/2002 | Zhang et al. | 713/168 |
| 2003/0096614 A1* | 5/2003 | Paila | 455/450 |
| 2004/0203800 A1* | 10/2004 | Myhre et al. | 455/445 |
| 2005/0154895 A1* | 7/2005 | Zhang | 713/182 |
| 2005/0154909 A1* | 7/2005 | Zhang et al. | 713/200 |

FOREIGN PATENT DOCUMENTS

WO    02/052784    7/2002

OTHER PUBLICATIONS

European Search Report dated Dec. 12, 2004 (EP04255196.0-2413).

* cited by examiner

*Primary Examiner*—Lester Kincaid
*Assistant Examiner*—Joel Ajayi

(57) ABSTRACT

A method is provided for determining a private key for a first network based on at least one security value associated with a second network. The method further includes establishing a plurality of sessions between a mobile terminal and the first network based on the private key.

21 Claims, 4 Drawing Sheets

AUTHENTICATING ACCESS TO A WIRELESS LOCAL AREA NETWORK BASED ON SECURITY VALUE(S) ASSOCIATED WITH A CELLULAR SYSTEM

BACKGROUND OF THE INVENTION

1. Field of the Invention

This invention relates generally to telecommunications, and, more particularly, to wireless communications.

2. Description of the Related Art

Cellular communication systems have increasingly become popular over the last several years. Some well-known cellular technologies include Advance Mobile Phone Service (AMPS), Global System for Mobile (GSM), Time Division Multiple Access (TDMA), Code Division Multiple Access (CDMA) and Orthogonal Frequency Division Multiple Access (OFDMA). Like the cellular communication systems, wireless local area networks (WLANs) have also gained popularity over the years. Some WLAN standards that have become popular include the 802.11x standards that have been ratified by the Institute of Electrical and Electronics Engineering (IEEE). Exemplary IEEE 802.11x standards include 802.11, 802.11a, 802.11b (also known as Wi-Fi), and 802.11g.

In view of the widespread use of cellular communications and WLAN communications, there has been a recent trend to develop integrated mobile terminals that allow coexistence between cellular and WLAN modes of operation. An integrated mobile terminal can thus communicate with both the existing cellular network infrastructure (for voice and/or data), and WLAN networks for high-speed data applications. While an integrated mobile terminal may be used to access both the cellular network and the WLAN network, these two networks largely remain independent, and thus are typically accessed independently of one another.

Advantages in converging cellular and WLAN technologies into a common mobile terminal may exist. However, these integration aspirations have given rise to security issues, such as determining an efficient and secure manner of authenticating a mobile terminal within two different networks (e.g., the cellular network and the WLAN network). Currently, a WLAN subscriber using an integrated mobile terminal has to be authenticated both for cellular access and WLAN access.

Existing procedures for authenticating the mobile terminal for both cellular and WLAN access, however, may be inefficient because the mobile terminal is authenticated with each of the supported networks (e.g., cellular and WLAN) using separate, independent authenticating keys. That is, the user has to be authenticated to the cellular network using a first key, and has to be authenticated to the WLAN network using a different, independent key. Managing the distribution of different authentication keys for the different networks can give rise to administrative challenges for the service provider or network manager. This administrative problem may be further exacerbated as the mobile terminals are designed to support communications with more than two networks.

The present invention is directed to addressing one or more of the problems set forth above.

SUMMARY OF THE INVENTION

In one embodiment of the present invention, a method for authenticating access to a first network based on security value(s) of a second system is provided. The method comprises determining a private key for a first network based on at least one security value associated with a second network. The method further comprises establishing a plurality of sessions between a mobile terminal and the first network based on the private key.

In another embodiment of the present invention, a method for authenticating access to a wireless local area network based on security value(s) of a cellular system is provided. The method comprises receiving at least one security value associated with a cellular network, determining a private key for a wireless local area network based on the security value associated with the cellular network, and allowing establishment of a plurality of sessions between a mobile terminal and the wireless local area network based on the private key.

In one embodiment of the present invention, a method is provided for authenticating access to a wireless local area network based on security value(s) of a cellular system is provided. The method comprises receiving, at a server, at least one security value associated with a cellular network; determining, using the server, a private key based on the at least one security value; determining, at a mobile terminal, a private key based on the at least one security value associated with the cellular network; and allowing establishment of a plurality of sessions between the mobile terminal and the wireless local area network based on the private key determined by the mobile terminal.

BRIEF DESCRIPTION OF THE DRAWINGS

The invention may be understood by reference to the following description taken in conjunction with the accompanying drawings, in which like reference numerals identify like elements, and in which.

Figure 1:
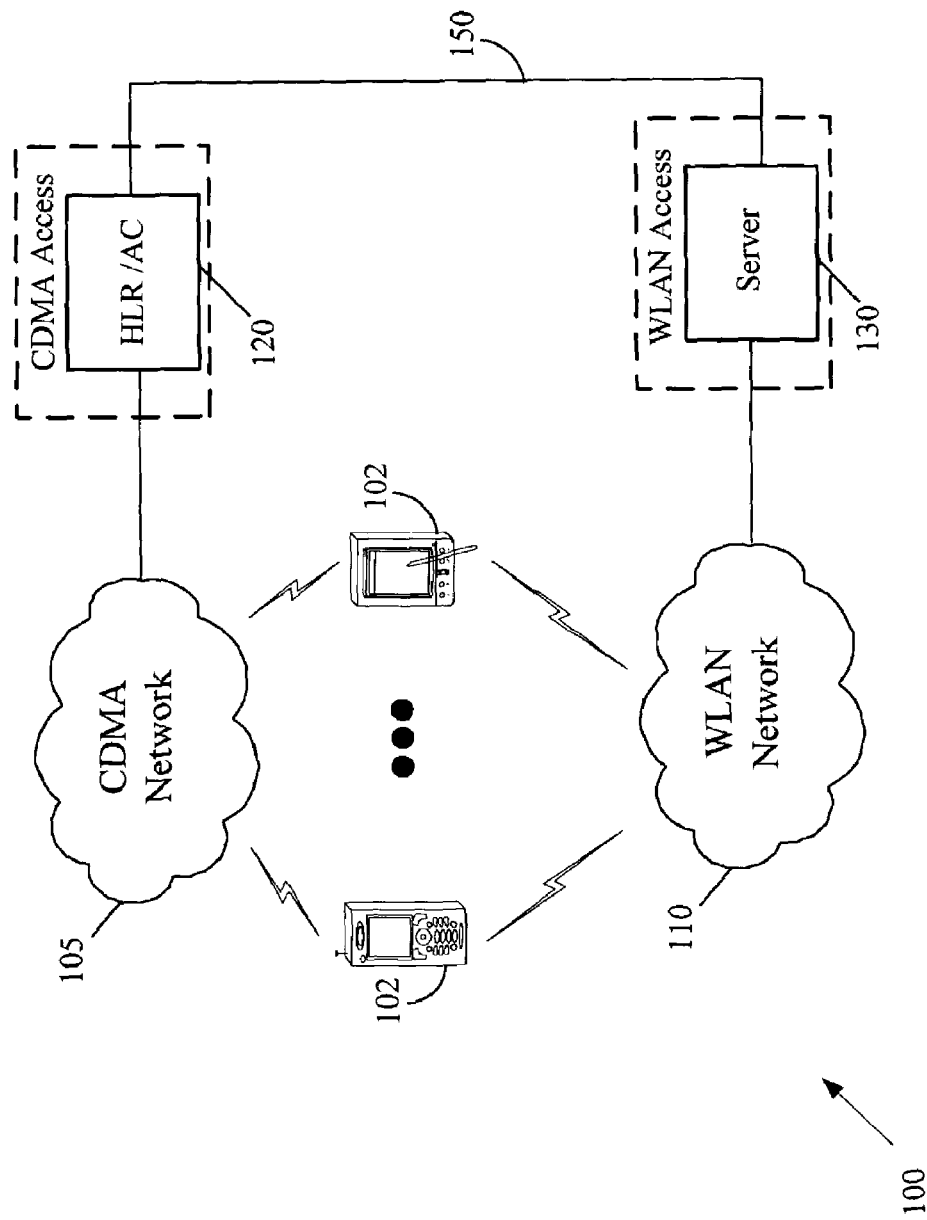
FIG. 1 is a block diagram illustration of a communications system including a cellular network and a wireless local area network, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a communications system 100 is illustrated, in accordance with one embodiment of the present invention. The communications system 100 of FIG. 1 allows the users of mobile terminals 102 to access a cellular system 105 and/or a wireless local area network (WLAN) system 110. Although not so limited, in the illustrated embodiment, the cellular system 105 is a Code Division Multiple Access (CDMA) system. CDMA is a "spread spectrum" technology, allowing many users to occupy the same time and frequency allocations in a given band/space. As its name implies, CDMA assigns unique codes to each communication to differentiate it from others in the same spectrum. CDMA includes second generation (2G) and third generation (3G) services. 2G CDMA standards are commonly known as CDMAONE and include the IS-95A and IS-95B standards. Two dominant standards for 3G services include CDMA2000 and wideband CDMA (CDMA2000 represents a family of technologies that includes CDMA2000-1X and CDMA2000-1xEV). For illustrative purposes, it is herein assumed that the CDMA network 105 of FIG. 1 is a CDMA2000 network, although one or more embodiments of the present invention may be applied to other cellular schemes, including, but not limited to, OFDMA, TDMA, GSM, and ASM.

The communications system 100 includes a home location register/authentication center (HLR/AC) 120 that controls access to the CDMA network 105 and further includes a server 130 that controls access to the WLAN network 110. In particular, the HLR/AC 120 authenticates the identity of the remote terminals 102 desiring access to the CDMA network 105, and the server 130 authenticates the identity of the remote terminals 102 desiring access to the WLAN network 110. As described in greater detail below, in accordance with one or more embodiments of the present invention, the mobile terminals 102 seeking to access the WLAN network 110 are authenticated based on security value(s) provided by the HLR/AC 120, which, as noted, is associated with the CDMA network 105. Thus, in one embodiment, the security provision(s) or value(s) available in a cellular network (e.g., CDMA network 105) may be employed to authenticate users desiring access to the WLAN network 110. In this manner, the security values (or some form of these parameters) that are utilized to authenticate access to the CDMA network 105 may also be utilized to authenticate the users desiring access to the WLAN network 110. This capability allows the service provider to readily administer or manage the key distribution for both its CDMA and WLAN subscribers.

CDMA network security protocols typically rely on a 64-bit authentication key (A-key) and the Electronic Serial Number (ESN) of the mobile terminal 102. A random binary number called RANDSSD, which is generated in the HLR/AC 120, also plays a role in the authentication procedures. The A-key is programmed into the mobile terminal 102 and is stored in the HLR/AC 120 associated with the CDMA network 105. CDMA uses the standardized Cellular Authentication and Voice Encryption (CAVE) algorithm to generate a 128-bit sub-key called the "Shared Secret Data" (SSD). The A-key, the ESN, and the network-supplied RANDSSD are inputs to the CAVE algorithm that generates the SSD key. The SDD key can be shared with roaming service providers to allow location authentication. A fresh SSD key can be generated when a mobile terminal 102 returns to the home network or roams to a different system.

In the illustrated embodiment, the mobile terminal 102 desiring access to the WLAN network 110 is authenticated via an Extensible Authentication Protocol (EAP) using a common long-term secret key (referred to as the "WKEY") that is established between the mobile terminal 102 and the server 130. As is described in the greater detail below, a private key, WKEY, is established based on the security value(s) generated by the HLR/AC 120 of the CDMA network 105. The private WKEY key, once calculated, is typically not shared with other, remote devices (i.e., not transmitted over the air). Because the access to the WLAN network 110 is achieved in the illustrated embodiment using the EAP protocol, the server 130 shown in FIG. 1 is an EAP server. The EAP protocol is described in Request for Comments (RFC) 2284. Some modifications to the EAP protocol may be desired in order to authenticate access to the WLAN network 110 using the security value(s) of the CDMA network 105. It is noted that the present invention is described in the context of the EAP protocol for illustrative purposes only, and that in alternative embodiments any other suitable authentication protocols may also be employed without deviating from the spirit and scope of the invention.

In one embodiment, and as described in greater below, the EAP server 130 may be communicatively coupled to the HLR/AC 120 over a connection 150 that supports the Signaling System 7 (SS7) protocol. Signaling System 7, which was developed by Comité Consultatif International Téléphonique et Télégraphique (CCITT) (now International Telecommunication Union), is a common channel signaling system and is used for communicating signaling information.

As utilized herein, a "network" may refer to one or more communication networks, channels, links, or paths, and systems or devices (such as routers) used to route data over such networks, channels, links, or paths.

It should be understood that the configuration of the communications system 100 of FIG. 1 is exemplary in nature, and that fewer, additional, or different components may be employed in other embodiments of the communications system 100. For example, although not shown, the communications system 100 may include a mobile services switching center and one or more base stations. As another example, in one embodiment, the system 100 may include an authentication, authorization, and accounting (AAA) server (not shown) and a network management system (not shown) that provides operation, administration, maintenance, and provisioning functions.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Figure 2:
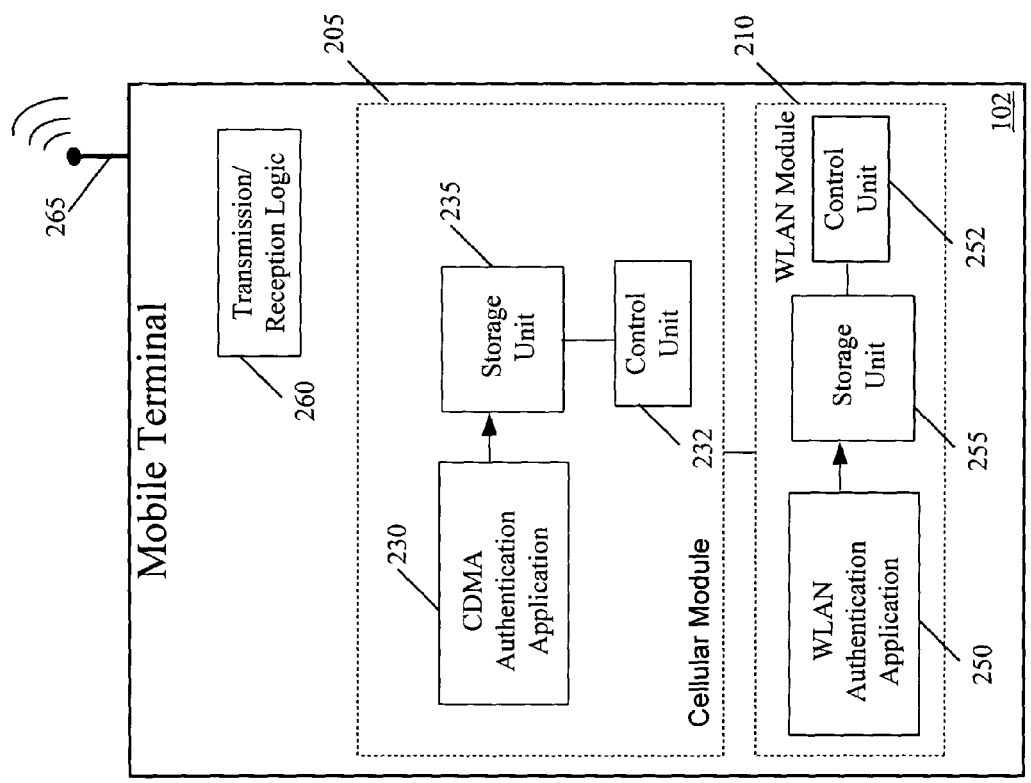
FIG. 2 depicts a block diagram of an access terminal, in accordance with one embodiment of the present invention.

Referring now to FIG. 2, a block diagram of the mobile terminal 102 of FIG. 1 is illustrated, in accordance with one embodiment of the present invention. The mobile terminal 102 may take the form of one of a variety of devices, including cellular phones, personal digital assistants (PDAs), laptops, digital pagers, wireless cards, and any other device capable of communicating with a cellular network (CDMA network 105 in the illustrated example) and WLAN network 110. In the illustrated embodiment of FIG. 2, the mobile terminal 102 includes two modules, a cellular module 205 and a WLAN module 210. The term "module," as utilized herein, may be implemented in software, hardware, or a combination thereof. For illustrative purposes, the mobile terminal 102 is shown to include two separate modules 205, 210, although in an alternative embodiment, the mobile terminal 102 may include one module that integrates the functionality of these two modules 205, 210.

The cellular module 205 is generally responsible for performing the requisite acts to communicate over the CDMA network 105, including performing the call processing functions once a session has been established. In the illustrated embodiment, the cellular module 205 includes a CDMA authentication (CA) application 230 for authenticating the mobile terminal user to the CDMA network 105. The CA application 230 may include the CAVE algorithm (discussed above) to generate the SSD key (i.e., the secondary authentication key used to calculate CDMA session keys). The cellular module 205 may include a control unit 232 that is communicatively coupled to a storage unit 235. In one embodiment, the CA application 230, if implemented in software, is storable in the storage unit 235 and executable by the control unit 232. In an alternative embodiment, the CA application 230 may be implemented in hardware or using a combination of hardware and software.

The WLAN module 210 of the mobile terminal 102 is generally responsible for allowing a user to communicate with the WLAN network 110 using any suitable protocol, such as one of the IEEE 802.11x protocols. One example of the WLAN module 210 may be a network interface card (NIC). In the illustrated embodiment, the WLAN module 210 includes a WLAN authentication (WA) application 250 for authenticating the mobile terminal user to the CDMA network 105. The WLAN module 210 may include a control unit 252 that is communicatively coupled to a storage unit 255. In one embodiment, the WA authentication application 250, if implemented in software, may be storable in the storage unit 255 and executable by the control unit 252. In an alternative embodiment, the WA authentication application 250 may be implemented in hardware or using a combination of hardware and software.

The mobile terminal 102 in the illustrated embodiment includes transmission/reception logic 260 and an antenna 265 for transmitting and receiving data over a wireless link. In one embodiment, various portions of the transmission/reception logic 260 may be implemented in the modules 205, 210.

Figure 3:
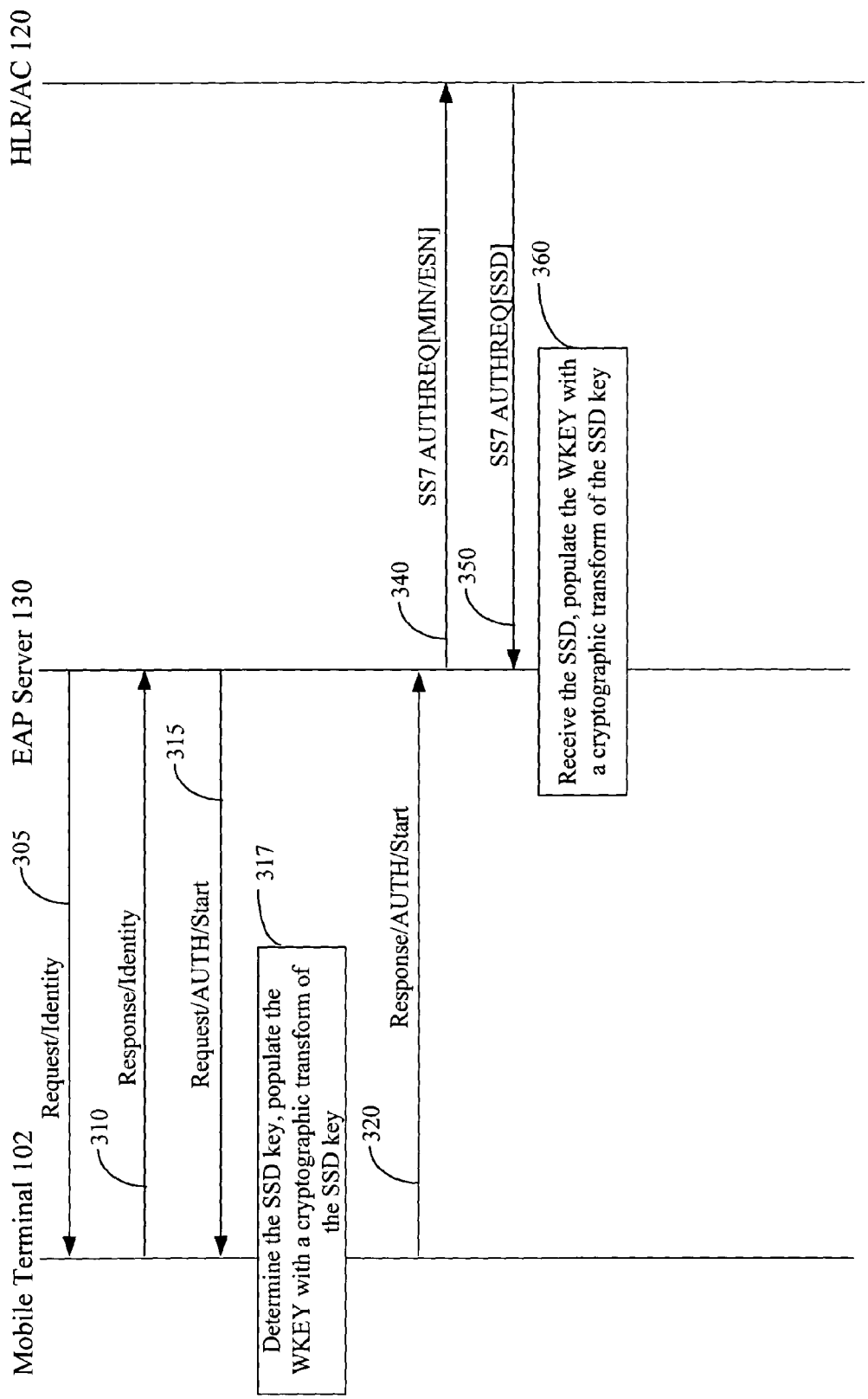
FIG. 3 depicts an exemplary message flow diagram of a procedure to determine a WKEY to authenticate a user to the wireless local area network of FIG. 1, in accordance with one embodiment of the present invention.

Referring now to FIG. 3, a procedure to determine a WKEY that may be employed to authenticate a user to the WLAN network 110 of FIG. 1 is illustrated, in accordance with one embodiment of the present invention. As is described in greater detail below, FIG. 3 illustrates one embodiment of the present invention in which the SSD key that is established during the CDMA authentication process is also employed to authenticate the mobile terminal 102 to the WLAN network 110. For the purposes of describing the authentication procedure of FIG. 3, it is herein assumed that the cellular module 205 (see FIG. 2) of the mobile terminal 102 generates the "Shared Secret Data" (SSD) key in the process of authenticating the user to the CDMA network 105. Thus, for the purposes of describing the authentication procedure of FIG. 3, it is assumed that the mobile terminal 102, as well as the HLR/AC 120 (see FIG. 1), has access to the SSD key.

The authentication procedure commences with the EAP server 130 providing an identity request (at 305) to the mobile terminal 102. The mobile terminal 102 responds (at 310) with an identifier that uniquely identifies the mobile terminal 102. For example, the mobile terminal 102 may provide an identifier that includes the International Mobile Subscriber Identity (IMSI) or a temporary identity (pseudonym).

Following the response provided (at 310) by the mobile terminal 102, the mobile terminal 102 receives a start request (at 315) (i.e., "Request/AUTH/Start" message) from the EAP server 130. For the purposes of this discussion, the term "AUTH" in the phrase "Request/AUTH/Start" indicates that a new transaction sub-identifier may be appended to the existing EAP protocol to support the desired functionality. Upon receiving the start request (at 315), the WLAN module 210 of the mobile terminal 102 obtains (at 317) the SSD key by initiating a local request to the cellular module 205, which, as noted above, has access to the SSD key because it was previously generated in association with the CDMA authentication process. The SSD key may then be used by the WLAN module 210 as, for example, its root key (WKEY) for authentication purposes, and, if desired, to generate session keys. In one embodiment, the WLAN module 210 may, at block 317 of FIG. 3, populate the WKEY with a cryptographic transform of the SSD key before using it for its intended purpose.

The WKEY may be used by the mobile terminal 102 to establish a call session with the WLAN 110 (see FIG. 1). In one embodiment, the WKEY may be repeatedly used to establish different call sessions. That is, a new WKEY is not required each time a different call session is established. For example, the WLAN module 210 may use the WKEY to determine a first session key to use in association with a first (call or data) session, and then, for another session, determine a second session key (based on the WKEY). Among other things, the session keys may be utilized to encrypt the transmitted data and decrypt the received data. Although not necessary, the WKEY may be updated or revised as desired, for example, either after an occurrence of a selected event or after the expiration of a preselected amount of time.

The mobile terminal 102 provides a Response/AUTH/Start message (at 320) to the EAP server 130. Upon receiving the start response from the mobile terminal 102, the EAP server 130 initiates a query request (at 340) to the HLR/AC 120 via an SS7 AUTHREQ message. In this request message, the EAP server 130 may provide a mobile station identifier in the form of a mobile identification number (MIN) and/or electronic serial number (ESN). The HLR/AC 120, based on the received request message, responds (at 350) to the EAP server 130 by providing the SSD key (associated with the mobile terminal 102 desiring authentication to the WLAN network 110) in an AUTHREQ message.

The EAP server 130 receives (at 360) the SSD key transmitted by the HLR/AC 120. The EAP server 130, in one embodiment, determines the WKEY by populating it with the cryptographic transform of the SSD key, much in the same manner as done by the mobile terminal 102 earlier. At this point, the EAP server 130 and the mobile terminal 102 each have access to the WKEY, which, in this embodiment, is based on the SSD key associated with the CDMA network 105. The WLAN module 210 of the mobile terminal 102 can thereafter use the WKEY to authenticate the user to the WLAN network 110 and/or also use the WKEY to generate session keys, if desired. The act of authenticating may include transmitting one or more random challenges and receiving one or more responses associated with the random challenges, where the response(s) may be determined based on applying the WKEY to the random challenge(s).

Figure 4:
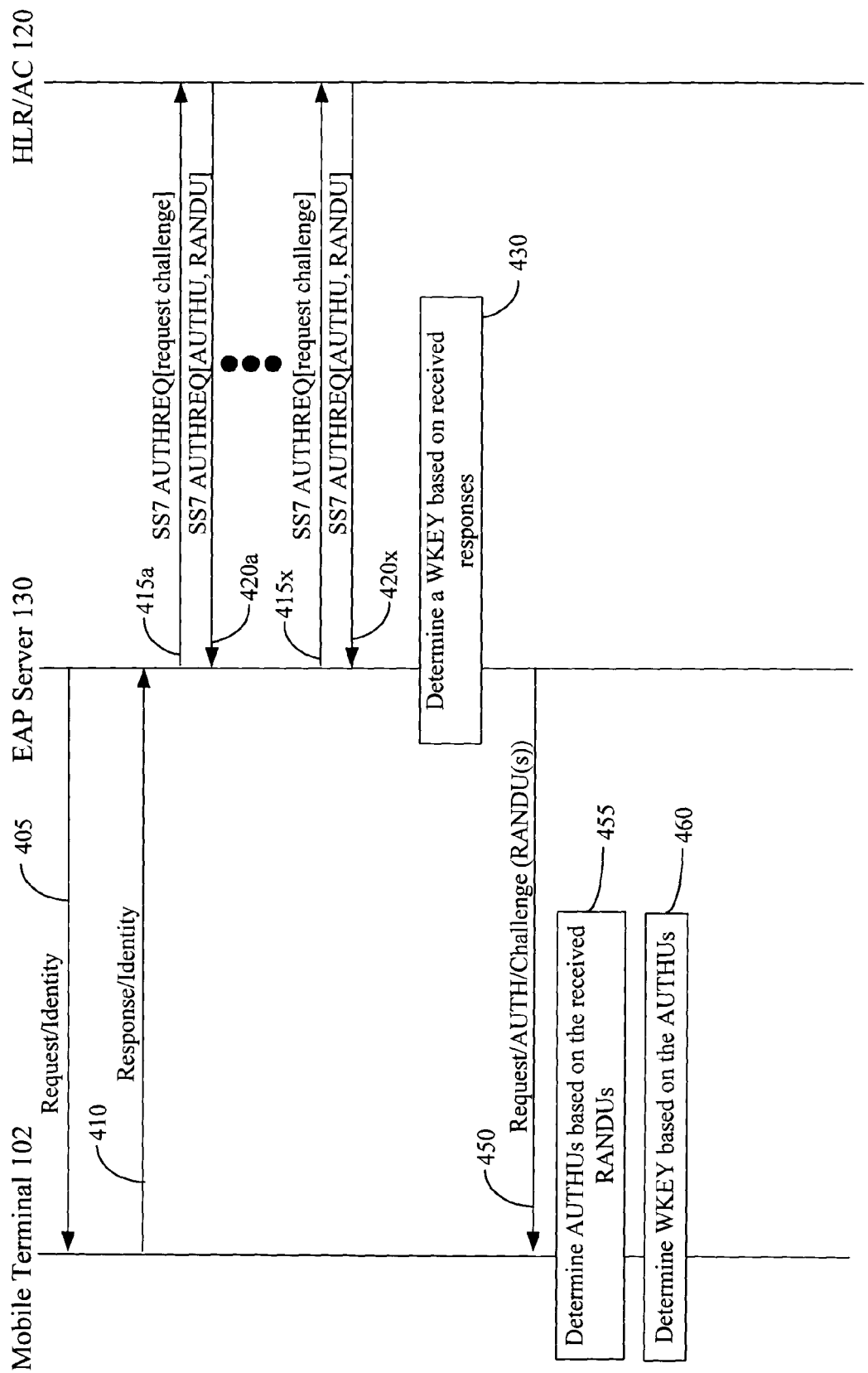
FIG. 4 illustrates an exemplary message flow diagram of a procedure to determine a WKEY to authenticate a user to the wireless local area network of FIG. 1, in accordance with another embodiment of the present invention.

Referring now to FIG. 4, a procedure to determine a WKEY that may be employed to authenticate the user to the WLAN network 110 of FIG. 1 is illustrated, in accordance with an alternative embodiment of the present invention. As is described in greater detail below, FIG. 4 illustrates one embodiment of the present invention in which random challenges provided by the HLR/AC 120 are used to generate the key, WKEY, which can then be used to authenticate the mobile terminal 102 to the WLAN network 110 and/or generate session keys, if desired. In this alternative embodiment, the SSD key need not be shared with the EAP server 130.

The authentication procedure commences with the EAP server 130 providing an identity request (at 405) to the mobile terminal 102. The mobile terminal 102 responds (at 410) with an identifier that uniquely identifies the mobile terminal 102. For example, the mobile terminal 102 may provide an identifier that includes the International Mobile Subscriber Identity (IMSI) or a temporary identity (pseudonym).

Following the response provided (at 410) by the mobile terminal 102, the EAP server 130 initiates a challenge request (at 415*a*) to the HRL/AC 120 via an SS7 AUTHREQ message, and the HRL/AC 120 responds to that request (at 420*a*) with an AUTHREQ message that includes an challenge, RANDU, and a response, AUTHU. Each RANDU challenge is typically a 24-bit value, and each AUTHU response is an 18-bit value. Although not so limited, in the illustrated embodiment, the EAP server 130 requests a plurality of challenges (see 415*a* and 415*x*) from the HLR/AC 120. In response, the HLV/AC 120 provides a pair of RANDU and AUTHU values (see 420*a* and 420*x*) for each request.

Based on receiving a series of AUTHU responses, the EAP server 130 determines (at 430) a WKEY. In one embodiment, the EAP server 130 combines the received AUTHU responses according to a preselected algorithm to determine the WKEY. The number of requests for challenges presented (at 415) by the EAP server 130 to the HLR/AC 120 may depend on a variety of factors, including the length of the WKEY, the length of the AUTHU response, and/or the preselected algorithm employed to generate the WKEY. For example, if a 128-bit WKEY is desired, and the preselected algorithm generates the WKEY based on concatenating a plurality of 18-bit AUTHU responses, then at least eight (8) requests, and thus eight (8) AUTHU responses, are needed to generate the 128-bit WKEY (i.e., 18×8=144 (where some bits may be discarded or truncated)). Of course, in other embodiments, fewer or additional requests may be made, depending on the particular implementation. It should be noted that the AUTHU responses may be combined in any desirable manner to arrive at the WKEY, as along as that combination can also be derived by the mobile terminal 102.

The EAP server 130 provides (at 450) the plurality of received RANDU challenges to the mobile terminal 102. In one embodiment, the RANDU challenges may be transmitted separately to the mobile terminal 102. In an alternative embodiment, the RANDU challenges may be combined (e.g., by concatenation or some other desirable method) before transmission to the mobile terminal 102. If transmitted as a combination, the mobile terminal 102 may, if desired, parse the received string to recover the plurality of RANDU challenges. Based on the received RANDU challenges, the mobile terminal 102 determines the respective AUTHU responses (at 455) using the SSD key. The SSD key, as described above, is calculable by the CA application 230 (see FIG. 2) of the mobile terminal 102, and thus is available to the WA application 250. Based on the calculated AUTHU responses, the WLAN module 210 of the mobile terminal 102 determines (at 460) the WKEY using the same algorithm as employed by the EAP server 130. In the illustrated embodiment, the AUTHU responses, once they are generated by the mobile terminal 102, are not transmitted to an authentication system, such as the EAP server 130, as they may otherwise be in a conventional Unique Challenge procedure. Rather, in the illustrated embodiment, the generated AUTHU responses are used internally by the mobile terminal 102 for the purposes of, for example, determining (at 460) the WKEY.

At block 460 of FIG. 4, both the EAP server 130 and the mobile terminal 102 have access to the WKEY. The WLAN module 210 of the mobile terminal 102 can thereafter use the WKEY, for example, as a root key to authenticate the user to the WLAN network 110 and/or also use the WKEY to generate session keys, if desired.

In accordance with one or more embodiments of the present invention, a procedure is provided for determining the WKEY based on one or more of the security values or values generated by the HLV/AC 120 of the CDMA network 105. Using the WKEY as the root key, for example, the mobile terminal 102 may authenticate itself to the WLAN network 110, and, if desired, generate one or more session keys. Because the WKEY is generated based on the security value (s) that are readily available in the cellular system 105, the administration task for the network operator or the service provider is simplified, as it may not be necessary for the operator or the provider to manage different keys for different networks.

For illustrative purposes, one or more embodiments of the present invention are described in the context of a wireless communications system. However, it should be appreciated that in alternative embodiments the present invention may also be implemented in wired networks. Additionally, the present invention may also be applicable to a system supporting voice-only communications or voice and data communications.

The term "security value," as utilized herein, refers to one or more secure values that have some level, although not necessarily absolute level, of protection. Although not so limited, examples of "security value" may include the SSD key, a signed response associated with a random challenge, a cryptographic value calculated using a key that is not shared (e.g., root key) or a key that is shared for a limited purpose (e.g., SSD key). As one example, the SSD key may be a cryptographic value that is calculated using the root key (A-key), and as another example, RANDU/AUTHU (in the context of CDMA) may be cryptographic values that are calculated using the SSD key.

The term "private key," as utilized herein, refers to a key that, once calculated, is generally not shared with another device. As noted, one example of a "private key" may be the WKEY. The private key may be utilized to authenticate a mobile terminal 102 to a network (the WLAN 110); it may be utilized to provide session security through encryption/decryption. In one embodiment, the "private key" may be utilized as a root key, if desired.

The act of calculating or determining "based on" a particular key or value is intended to include acts that are based directly or indirectly on the use of that key or value. Thus, the term "based on," as utilized herein, is intended to cover any intermediate steps performed or values that are ultimately derived from the key or value being used.

Those skilled in the art will appreciate that the various system layers, routines, or modules illustrated in the various embodiments herein may be executable control units (such as the control units 232 and 252 (see FIG. 2)). The control units 232, 252 may include a microprocessor, a microcontroller, a digital signal processor, a processor card (including one or more microprocessors or controllers), or other control or computing devices. The storage devices 235, 255 referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EE-PROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit 232, 252, cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method comprising:

Determining, at a device, a private key for a first network based on at least one security value associated with a second network, wherein the private key refers to a key that, once calculated, is not shared with another device, wherein the second network is a cellular network and the first network is a wireless local area network, and wherein determining the private key comprises determining the private key based on a shared secret data key associated with the cellular network; and establishing a plurality of sessions between a mobile terminal and the first network using the private key, wherein determining the private key based on the shared secret data key comprises applying a root key, an electronic serial number associated with the mobile terminal, and a network-supplied random value to a Cellular Authentication and Voice Encryption (CAVE) algorithm to generate the private key.

2. The method of claim 1, wherein determining the private key further comprises populating the private key with a cryptographic transform of the shared secret data key.

3. The method of claim 1, wherein the second network is a cellular network having an associated authentication center and the first network is a wireless local area network, and wherein determining the private key comprises determining the private key based on one or more random challenges generated by the authentication center associated with the cellular network.

4. The method of claim 3, wherein the cellular network is a code division multiple access (CDMA) network, wherein determining the private key comprises determining one or more responses associated with the one or more challenges based on the shared secret data key associated with the CDMA network and combining the determined one or more responses to form the private key.

5. The method of claim 1, further comprising determining at least one session key based on the determined private key.

6. The method of claim 1, wherein establishing the plurality of sessions comprises authenticating the mobile terminal to the first network for each of the plurality of sessions.

7. The method of claim 5, wherein authenticating the mobile terminal to the first network comprises:

receiving a challenge from the first network; and transmitting a response associated with he received challenge, wherein the response is calculated based on the private key.

8. The method of claim 1, wherein establishing the plurality of sessions comprises determining a session key for each of the plurality of sessions based on the private key.

9. A method comprising:

Receiving, at a device, at least one security value associated with a cellular network; determining, at the device, a private key for a wireless local area network based on the security value associated with the cellular network, wherein the private key refers to a key that, once calculated, is not shared with another device, and wherein determining the private key comprises determining the private key based on a shared secret data key associated with the cellular network, wherein determining the private key based on the shared secret data key comprises applying a root key, an electronic serial number associated with the mobile terminal, and a network-supplied random value to a Cellular Authentication and Voice Encryption (CAVE) algorithm to generate the private key; and allowing establishment of a plurality of sessions between a mobile terminal and the wireless local area network using the private key.

10. The method of claim 9, wherein the cellular network is a code division multiple access (CDMA) network, and wherein receiving the at least one security value comprises receiving a shared secret data key associated with the CDMA network.

11. The method of claim 10, wherein receiving the shared secret data key comprises receiving the shared secret data key over a Signaling System 7 (SS7) protocol.

12. The method of claim 10, wherein the cellular network is a code division multiple access (CDMA) network having an associated authentication center, and wherein receiving at least one security value comprises receiving one or more responses associated with one or more challenges that are generated by the authentication center associated with the CDMA network.

13. The method of claim 12, wherein receiving the one or more responses comprises receiving the one or more responses over a Signaling System 7 (SS7) protocol.

14. The method of claim 12, further comprises receiving the one or more challenges from the authentication center and providing the one or more challenges to the mobile terminal.

15. The method of claim 14, wherein providing the one or more challenges to the mobile terminal comprises providing the one or more challenges over an Extensible Authentication Protocol.

16. The method of claim 14, wherein determining the private key comprises combining the one or more responses.

17. A method comprising:

Receiving, at a server that is associated with a wireless local area network, at least one security value associated with a cellular network; determining, using the server, a private key based on the at least one security value; determining, at a mobile terminal, a private key based on the at least one security value associated with the cellular network, wherein the private key refers to a key that, once calculated, is not shared with another device, wherein determining the private key comprises determining the private key based on a shared secret data key associated with the cellular network, wherein determining the private key based on the shared secret data key comprises applying a root key, an electronic serial number associated with the mobile terminal, and a network-supplied random value to a Cellular Authentication and Voice Encryption (CAVE) algorithm to generate the private key; and allowing establishment of a plurality of sessions between a mobile terminal and the wireless local area network using the private key determining by the mobile terminal.

18. The method of claim 17, wherein receiving the at least one security value comprises receiving a shared secret data key associated with the cellular network.

19. The method of claim 17, wherein receiving the at least one security value comprises receiving one or more random challenges generated by an authentication center associated with the cellular network and wherein determining, at the server, comprises determining the private key based on one or more signed responses associated with the respective one or more challenges.

20. The method of claim 17, further comprises transmitting messages between the server and the mobile terminal using an Extensible Authentication Protocol.

21. The method of claim 17, wherein determining, at a mobile terminal, the private key based on the at least one security value associated with the cellular network comprises determining the at least one security value associated with at least one of a CDMA network, TDMA network, GSM network, OFDMA network, and AMPS network.

* * * * *

UNITED STATES PATENT AND TRADEMARK OFFICE
CERTIFICATE OF CORRECTION

PATENT NO. : 7,593,717 B2
APPLICATION NO. : 10/661715
DATED : September 22, 2009
INVENTOR(S) : Marcovici et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1720 days.

Signed and Sealed this

Twenty-eighth Day of September, 2010

David J. Kappos
*Director of the United States Patent and Trademark Office*